No. 691,072. Patented Jan. 14, 1902.
L. H. PRICE.
SAW SET.
(Application filed Apr. 3, 1901.)
(No Model.)
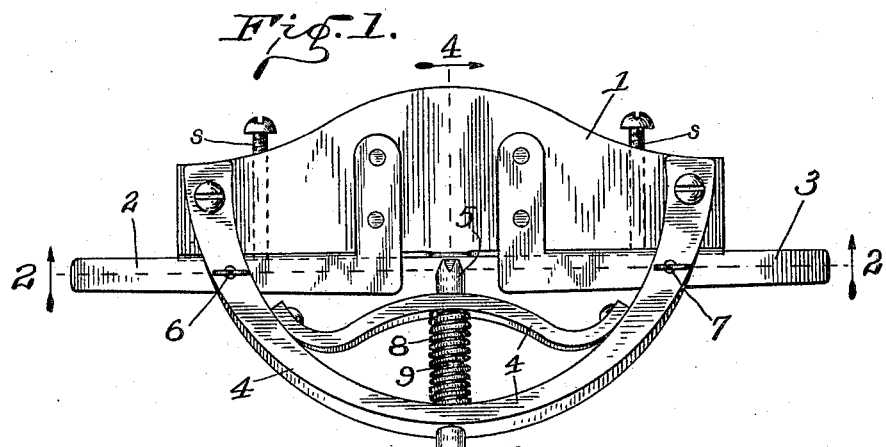
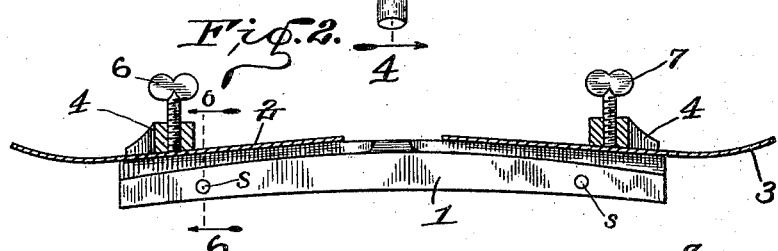
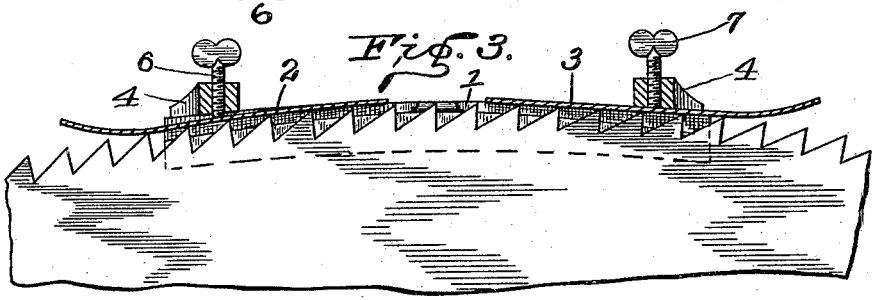
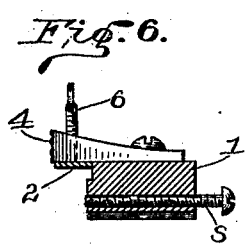
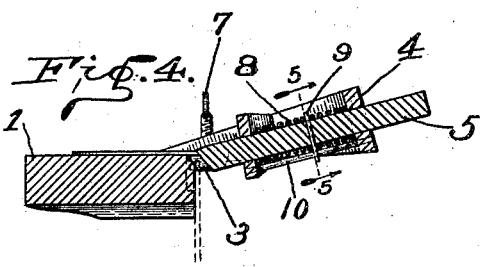
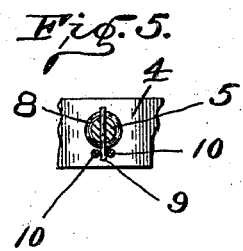
WITNESSES:
INVENTOR
Leonidas H. Price,
BY
Chester Bradford,
ATTORNEY
THE NORRIS PETERS CO., PHOTO-LITHO., WASHINGTON, D. C.

UNITED STATES PATENT OFFICE.

LEONIDAS H. PRICE, OF INDIANAPOLIS, INDIANA.

SAW-SET.

SPECIFICATION forming part of Letters Patent No. 691,072, dated January 14, 1902.

Application filed April 3, 1901. Serial No. 54,121. (No model.)

*To all whom it may concern:*

Be it known that I, LEONIDAS H. PRICE, a citizen of the United States, residing at Indianapolis, in the county of Marion and State of Indiana, have invented certain new and useful Improvements in Saw-Sets, of which the following is a specification.

The object of my said invention is to provide a tool by which the teeth of saws may be accurately set in the process of putting in order for use. It is especially designed for that variety of saws known as "veneer-saws," in which the sawing and cutting portion is composed of segments of thin steel secured around the periphery of a disk of heavier metal and, owing to the character of the work to be done, are required to be set with great accuracy.

A saw-set embodying my said invention will be first fully described and the novel features thereof then pointed out in the claims.

Referring to the accompanying drawings, which are made a part hereof, and on which similar reference characters indicate similar parts, Figure 1 is a top or plan view of a saw-set embodying my said invention; Fig. 2, a vertical sectional view thereof as seen when looking in the direction indicated by the arrows from the dotted line 2 2 in Fig. 1; Fig. 3, a view similar to Fig. 2, except that a fragment of a saw is shown in position to be operated upon; Fig. 4, a transverse vertical sectional view as seen when looking in the direction indicated by the arrows from the dotted line 4 4 in Fig. 1; Fig. 5, a detail sectional view as seen when looking in the direction indicated by the arrows from the dotted line 5 5 in Fig. 4, and Fig. 6 a detail sectional view as seen from the dotted line 6 6 in Fig. 2.

My improved saw-set is composed of a heavy block of metal 1, against which the side of the saw bears when in position to be operated upon, suitable bearing-plates 2 and 3 in the form of springs and which are adapted to be adjusted as required, a housing 4, secured to the block and carrying the set-pin, and the set-pin 5, mounted in said housing and arranged to be driven against the teeth in the operation of setting the saw. The block 1, as best shown in Fig. 2, has a suitable face against which the side of the saw bears and the upper portion of which is cut away to permit the points of the teeth to pass over it without becoming dulled thereby. It is curved somewhat to conform to the outline of the edge of the saw. At its central point, just opposite the inner end of the set-pin 5, its face is beveled to an angle to which the saw-teeth are to be set. At suitable points, preferably near its ends, this body-block is provided with adjustable bearing-screws, by means of which the position of the saw in relation to the set may be determined. The maximum set will be given when these screws are withdrawn and will be decreased as they are driven farther out, as will be readily understood. The bearing-plates 2 and 3 are rigidly secured to the body near its central portion, as shown, and extend out alongside it in position to bear upon the points of the saw-teeth. Being formed of spring material, said plates are easily adjusted by means of set-screws 6 and 7, and thus the edge of the saw is brought into proper relation with the operative part of the set. By adjusting one of the bearing-plates downwardly more than the other I am enabled to give the teeth a lead as well as set them outwardly, which is quite valuable for the class of saws for which this set is especially used, as it is necessary to give them as much clearance as possible with a minimum set, the wood which they cut being usually valuable, and it being therefore highly desirable to make the saw-kerf as narrow as possible. This is illustrated in Fig. 3, in which the plate 2 is shown as forced down by its set-screw 6.

The set-pin 5 is mounted in suitable bearings in the housing 4 and is adapted to be driven against the outside of the teeth and force them over against the angling-face on the block, and thus giving them the set desired. A spring 8 is interposed between the two members of this housing, and a pin 9 passes down through the set-pin about midway of the spring. Said spring is so arranged as to bear against both members of the housing, and thus the said pin 5 is held yieldingly to the position it should occupy when at rest, while capable of being driven in, and thus operated under the force of a suitable blow, after which it may be returned to position. Where, as is desirable, the set-pin is round, it is prevented from turning by means of this same pin, which passes through it and between coils of the spring, simple rods 10, forming guideways, being provided for the purpose. As will be seen by an examination of the drawings, particularly Figs. 1, 4, and 5, the spring 8 is a coiled spring, which surrounds the set-pin and is interposed between two bearing-surfaces provided for the purpose in the housing 4. The pin 9 passes down through the set-pin at about its middle and also passes between the coils of the spring 8. The spring is loosely mounted and is adapted to be revolved. By this means I am enabled to adjust the set-pin back and forth by simply turning the spring 8 around it, as the pin 9, being held rigidly, will pass along the spiral path between the coils of the spring, and thus carry the said pin in one direction or the other, according to which way the said spring is turned, and the set-pin is thus adjusted nearer to or farther from the anvil-surface on the body-block, as may be desired.

In operation a saw is placed in the position indicated in Fig. 3, the bearing-plates 2 and 3 are suitably adjusted, and the tool is then moved along over the saw from tooth to tooth, each tooth being set by a suitable blow of a hammer on the set-pin 5.

Having thus fully described my said invention, what I claim as new, and desire to secure by Letters Patent, is—

1. The combination, in a saw-set, of a body-block, two flexible bearing-plates secured thereto, adjusting-screws for determining the positions of said bearing-plates, a housing rigidly secured to the body-block, a set-pin mounted in said housing, a spring adjacent to said set-pin, and a connection between said set-pin and said spring.

2. The combination, in a saw-set, of a body-block, a housing, a set-pin mounted in said housing, a coiled spring surrounding said set-pin and interposed between two members of said housing, and a connection between said set-pin and said spring at a point intermediate the ends thereof whereby said spring is enabled to hold said set-pin to its proper at-rest position in both directions, substantially as set forth.

3. The combination, in a saw-set, of a body-block, a housing mounted thereon, a set-pin mounted in said housing, a coiled spring surrounding said set-pin and interposed between two bearing-points therefor on said housing, and a pin passing through said set-pin and between the coils of said spring, whereby, by turning said spring around said pin, the latter is adjusted longitudinally in its bearings, substantially as set forth.

In witness whereof I have hereunto set my hand and seal, at Indianapolis, Indiana, this 30th day of March, A. D. 1901.

LEONIDAS H. PRICE. [L. S.]

Witnesses:
CHESTER BRADFORD,
S. H. COLVIN.